United States Patent
Calleja

(10) Patent No.: US 7,014,053 B2
(45) Date of Patent: *Mar. 21, 2006

(54) WAREHOUSE PALLET-RACK SAFETY NETTING SYSTEM

(75) Inventor: Michael J. Calleja, Brisbane, CA (US)

(73) Assignee: Safety Systems, LLC, South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/978,994

(22) Filed: Oct. 31, 2004

(65) Prior Publication Data

US 2005/0056605 A1 Mar. 17, 2005

Related U.S. Application Data

(63) Continuation of application No. 10/360,908, filed on Feb. 7, 2003, now Pat. No. 6,837,388, which is a continuation of application No. 09/827,962, filed on Apr. 4, 2001, now Pat. No. 6,585,122.

(51) Int. Cl.
*A47F 5/00* (2006.01)
(52) U.S. Cl. .................. 211/183; 211/180; 182/138
(58) Field of Classification Search ............ 211/180, 211/183, 191; 160/124, 222, 223, 84.06, 160/330; 182/138
See application file for complete search history.

(56) References Cited

U.S. PATENT DOCUMENTS

| 2,761,450 | A | 9/1956 | Kellogg |
| 4,981,225 | A | 1/1991 | Cole |
| 5,170,829 | A | 12/1992 | Duncan |
| 5,573,125 | A | 11/1996 | Denny |
| 5,778,955 | A | 7/1998 | Chen |
| 6,068,085 | A | 5/2000 | Denny |
| 6,098,750 | A | 8/2000 | Reynolds |
| 6,186,274 | B1 * | 2/2001 | Reynolds et al. ........... 182/138 |
| 6,585,122 | B1 | 7/2003 | Calleja |
| 6,619,490 | B1 | 9/2003 | Calleja |
| 6,722,512 | B1 | 4/2004 | Scully |
| 6,837,388 | B1 * | 1/2005 | Calleja ...................... 211/183 |

* cited by examiner

*Primary Examiner*—Jennifer E. Novosad
(74) *Attorney, Agent, or Firm*—Robert Charles Hill

(57) ABSTRACT

A pallet rack safety net system comprises two parallel horizontal wire ropes that are stretched along the top and bottom edges of a shelf opening. A pair of hung left and right screens of flexible netting are attached between the top and bottom wire ropes so that they can be horizontally separated at the middle of the shelf opening. The inside vertical edges of each screen are finished with a metal bar and a clasp so the screens can be latched together at the middle. The outside left and right edges of the screens are secured to the outside of the shelf opening. If used on a top shelf that has no supports at each side of the opening, a pair of support posts are included that hold aloft the top horizontal wire rope. A network of stays and guys are used to reinforce each such post.

6 Claims, 3 Drawing Sheets

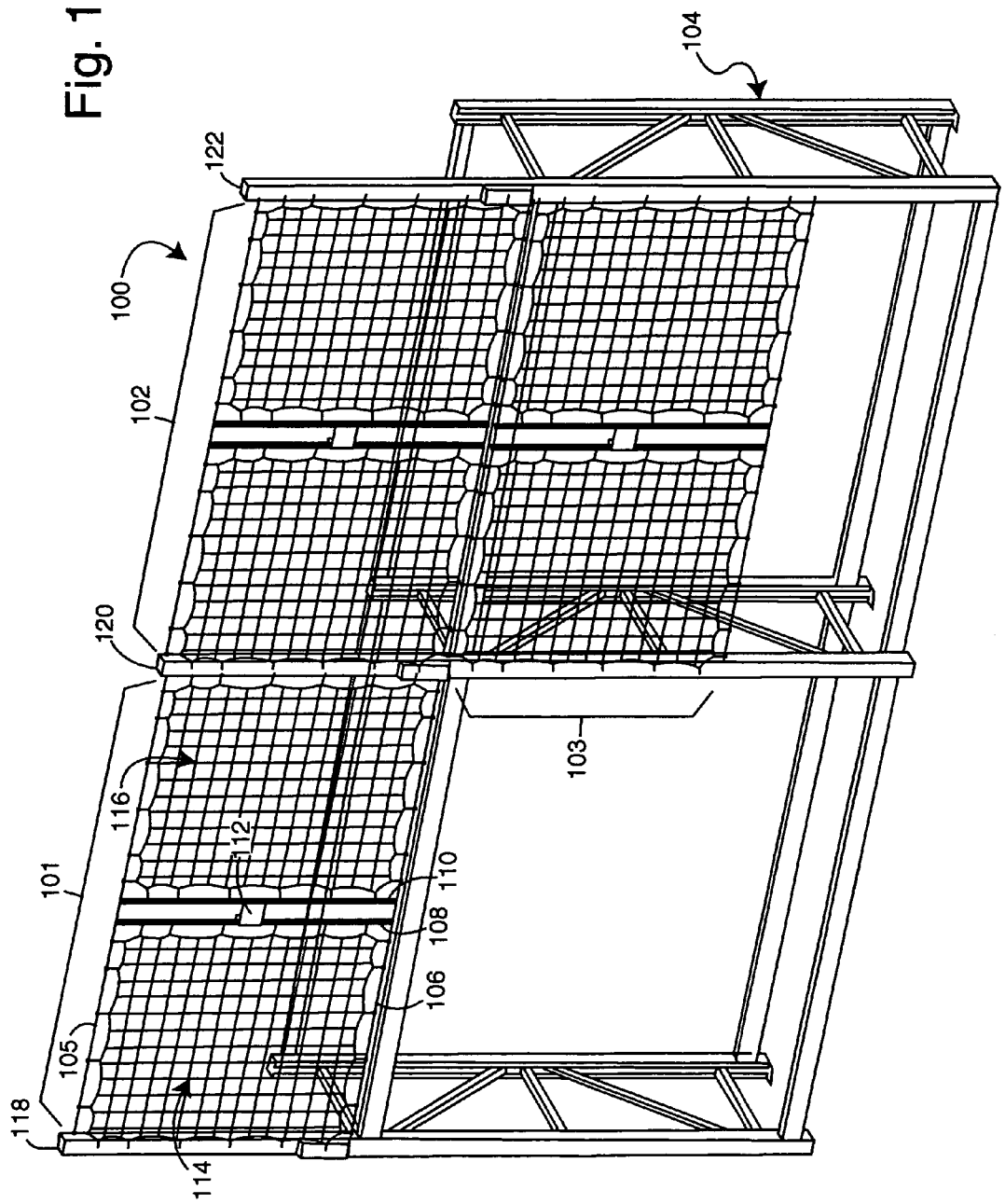

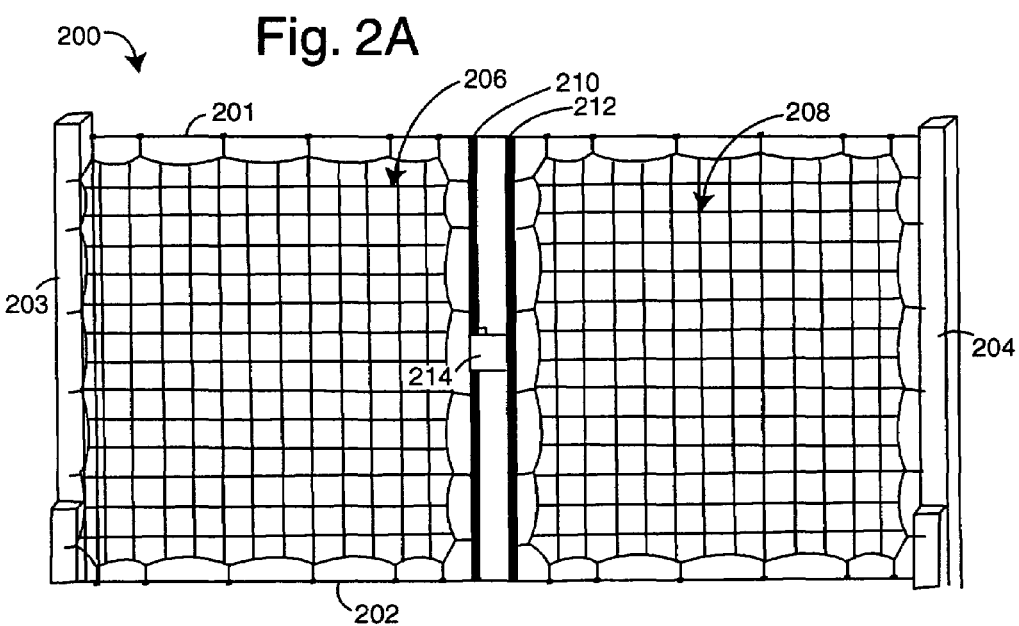
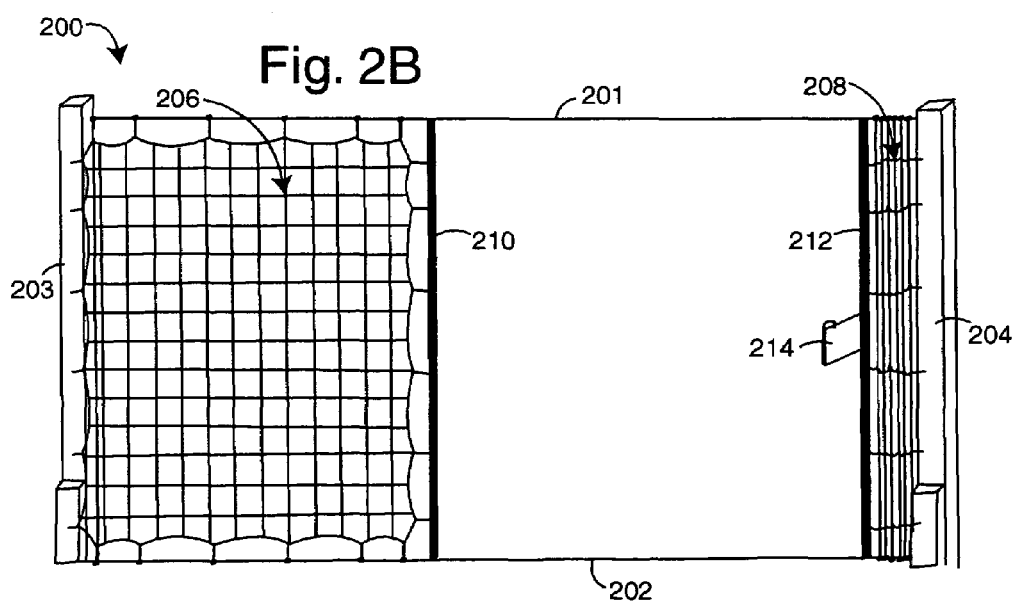

WAREHOUSE PALLET-RACK SAFETY NETTING SYSTEM

This application is a continuation of application Ser. No. 10/360,908 filed on Feb. 7, 2003, now U.S. Pat. No. 6,837,388, which is a continuation of Ser. No. 09/827,962 filed on Apr. 4, 2001, now. U.S. Pat. No. 6,585,122 issued Jul. 1, 2003.

BACKGROUND OF THE INVENTION

1. Field of the Invention

The present invention relates to material-handling systems, and more particularly to safety netting that contains product on overhead shelves and that protect workers and customers below in the aisles.

2. Description of Related Art

Shelves and racks are a convenient way to store items, and stored many levels high such can maximize floor space. A typical warehouse retail store like The Home Depot has pallet racks that are two, three, and four levels high. Heavy items, like backup store inventory on a pallet, are placed and fetched from high above by a forklift.

Heavy items placed ten to twenty feet high above aisles in pallet racks and on shelves can present a significant and not-so-rare personal injury risk. Shaking, bumping, and poorly stacked items can come tumbling down and hurt people below, or at a minimum damage the product.

Not surprisingly, a number of different devices and methods have evolved to address these problems. The Law too has entered the picture with OSHA regulations, and personal injury lawsuits. New company procedures, union work rules, and plain common sense now dictate that an effective restraint, barrier, or guard system be installed on the higher shelves and rack to prevent falling debris.

As could be expected, some methods and devices are better than others. Conventional safety products can be expensive to buy, and difficult to work with or install. A simple netting secured all around the shelf opening can be effective if the netting is strong enough and secured well. But the way the netting is secured and constructed can mean opening the net to access the shelf is made very difficult, in some cases requiring a technician to climb high above and use hand tools to open and/or close the net.

Sinco/Sala (Middletown, Conn.), InCord (East Haddam, Conn.), and others that market rack guard systems use different kinds of barriers and attachment hardware. For example, Sinco/Sala uses a nylon mesh that is stretched inside a perimeter frame of taut wire rope. So-called EZ-clips are used to attach the netting to the wire rope frame. InCord markets their SURE-GARD™ synthetic mesh that is able to stretch under load. A variety of mesh-size openings are offered for a range of contained item types and sizes.

A MEZZNET-DEFENSE-SYSTEM™ marketed by Bay-Nets (East Haddam, Conn.) raises and lowers flexible netting hung from a rod that is guided up and down by a pair of side posts. Open-sided mezzanines with these systems are accessed by operating a cable and pulley system that connects to the rod and runs inside the two side posts. The cable and pulleys can be manually cranked, or powered by an electric motor. BayNets' advertising literature suggests that these systems meet federal Occupational Safety and Health Administration (OSHA) fall-protection standards.

SUMMARY OF THE INVENTION

Briefly, a pallet rack safety netting embodiment of the present invention comprises two parallel horizontal wire ropes that are stretched along the top and bottom edges of a shelf opening. A pair of hung left and right screens of flexible netting are attached between the top and bottom wire ropes so that they can be horizontally separated at the middle of the shelf opening. The inside vertical edges of each screen are finished with a metal bar and a clasp so the screens can be latched together at the middle. The outside left and right edges of the screens are secured to the outside of the shelf opening. If used on a top shelf that has no supports at each side of the opening, a pair of support posts are included that hold aloft the top horizontal wire rope. A network of stays and guys are used to reinforce each such post.

An advantage of the present invention is that a safety netting is provided that is effective.

Another advantage of the present invention is that a safety netting is provided that is easy to install.

A further advantage of the present invention is that safety netting systems are provided that are simple to operate.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 1 is a perspective view of a safety netting system embodiment of the present invention installed on a pallet rack shelving unit;

FIGS. 2A and 2B are diagrams representing the opening and-closing of the screens and the use of the clasp.

DETAILED DESCRIPTION OF THE INVENTION

Figure 3:
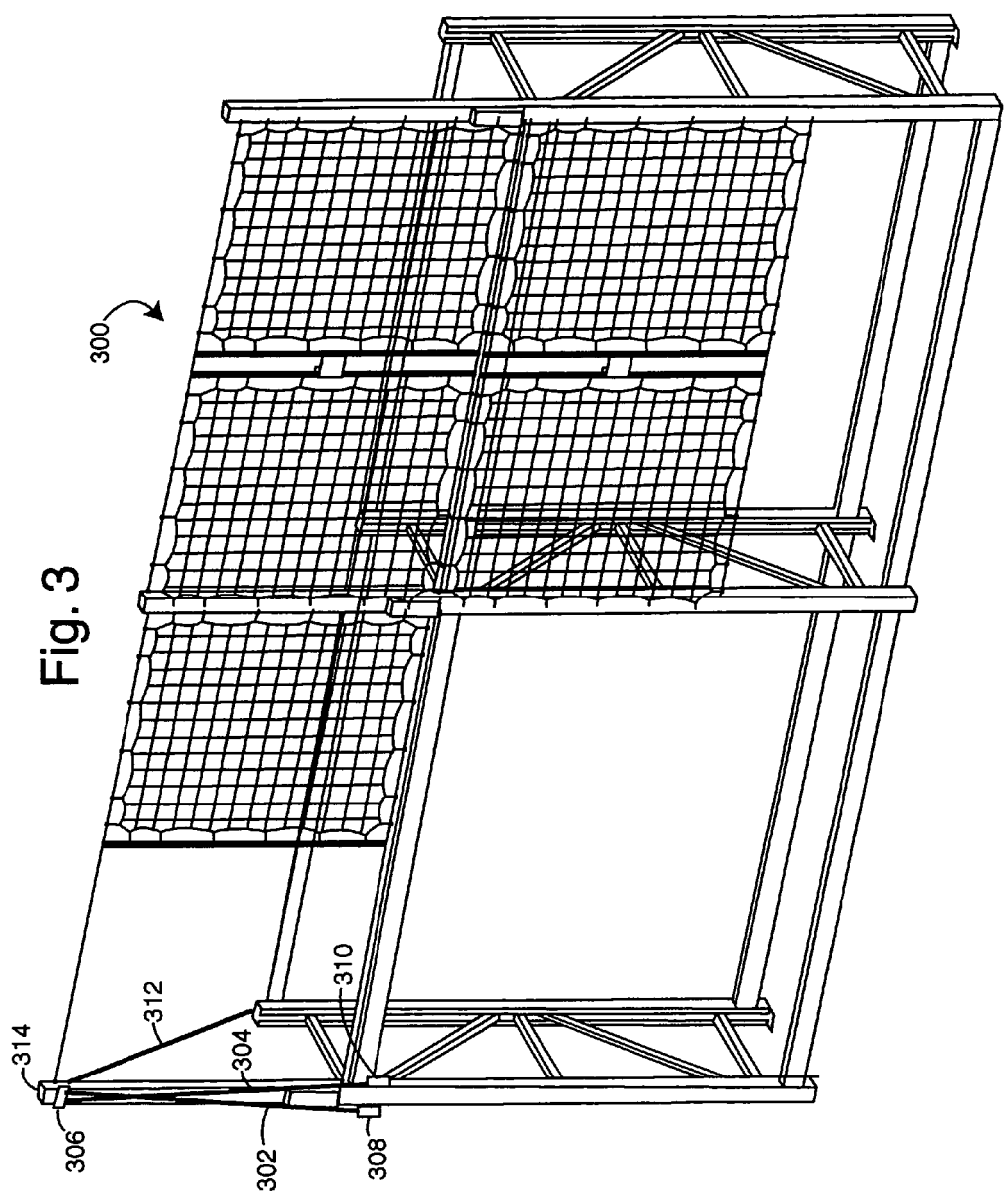
FIG. 3 is a perspective view of the safety netting system of FIG. 1 with the addition of guy wire stays that reinforce the posts above the top shelf of the pallet rack.

FIG. 1 illustrates a safety netting system embodiment of the present invention, referred to herein by the reference numeral 100. The safety netting system 100, in this example, comprises three screened sections, 101–103, that are attached to a pallet rack 104. Such combination would be used in an ordinary warehouse, or in a warehouse store like The Home Depot. The principle purpose of the safety netting system 100 is to keep objects on the overhead shelves of the pallet rack 104 from falling down onto the floor, for whatever reason. Each of the three sections of the safety netting system 100 is exemplified by section 101, which includes a top horizontally strung wire rope 105 and a bottom strung wire rope 106. A left-screen bar 108 and a right-screen bar 110 are configured to slide along the wire ropes and close at the middle with a snap latch 112.

A left screen 114 is fixed at its left edge to the framework of the pallet rack 104. Similarly, a right screen 116 is fixed at its right edge at the opposite side of the shelf opening to the pallet rack framework. The screens comprise flexible netting of nylon rope, chain link fencing, rigid vertical links, etc. A set of posts 118, 120, and 122 is added to the top of the pallet rack 104 to hold aloft the top wire rope 105. Each such post may be guyed or stayed like the main mast of a sailboat if the vertical frame members of the pallet rack 104 cannot be supplied as one solid piece of box-beam or I-beam steel. If the loads to be secured on the top shelves are especially heavy and dangerous, it is preferable to guy and stay the posts 118, 120, and 122 in every instance.

FIGS. 2A and 2B illustrate how the screens of system 100, for example, are latched together (FIG. 2A) and separated (FIG. 2B). A top and bottom pair of parallel wire ropes 201 and 202 of safety netting system 200 are stretched taut between a rigid pair of vertical support posts 203 and 204. A left and a right draw screen 206 and 208 are made of flexible netting, e.g., made of nylon rope. A number of loops top and bottom allow the screens to slide left and right on the wire ropes. The left screen 206 is secured with wire loops or hooks to the left post 203. And the right screen 208 is secured at its right edge with wire loops or hooks to the right post 204. A rigid left bar 210 finishes the right edge of the left screen 206. A rigid right bar 212 similarly finishes the left edge of the right screen 208. These rigid bars help close up a gap between them and the screens when a latch 214 is secured.

FIG. 3 shows how a vertical post can be reinforced and stiffened. In a rack storage system 300 similar to pallet system 100 in FIG. 1, a pair of wire stays 302 and 304 crisscross one another from anchor plates 306, 308, and 310. A back stay 312 further supports a vertical post 314. Each similar post preferably receives an identical combination of wire stays, anchor plates, and back stays. These then all resist any tendency of the posts to fold or distort under load.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A safety device for preventing objects from falling off a shelf, comprising:
   a pair of horizontally disposed top and bottom ropes for stretching above and below a shelf opening;
   a pair of left and right screens for sliding attachment between the top and bottom ropes such that each screen can be horizontally separated at the middle, and wherein outside edges of each screen can be fixed to said shelf opening to the left and right;
   a left bar attached to a right edge of the left screen;
   a right bar attached to a left edge of the right screen; and
   a clasp for latching and unlatching the left and right bars together for securing and accessing objects stored on said shelf behind the screens.

2. The safety device of claim 1, further comprising:
   a pair of left and right posts for extending above a top shelf and for providing mechanical support to the top rope.

3. The safety device of claim 2, wherein:
   said outside edges of each screen are fixed to the left and right posts.

4. The safety device of claim 1, wherein:
   the screens comprise flexible netting stretched between the top and bottom ropes.

5. A safety device for preventing objects from falling, comprising:
   a pair of horizontally disposed top and bottom ropes for stretching above and below a shelf opening;
   a pair of left and right screens for sliding attachment between the top and bottom ropes such that they can be horizontally separated at the middle, and wherein outside edges of each screen can be fixed to said shelf opening to the left and right;
   a left bar attached to a right edge of the left screen;
   a right bar attached to a left edge of the right screen; and
   means for latching and unlatching the left and right bars together for securing and accessing objects stored behind the screens.

6. A safety device for preventing heavy objects from falling, comprising:
   a pair of horizontally disposed top and bottom ropes for stretching above and below a shelf opening;
   a pair of left and right screens for sliding attachment between the top and bottom ropes such that they can be horizontally separated at the middle, and wherein outside edges of each screen can be fixed to said shelf opening to the left and right;
   a left bar attached to a right edge of the left screen;
   a right bar attached to a left edge of the right screen; and
   means for latching and unlatching the left and right bars together for securing and accessing heavy objects stored behind the screens.

* * * * *